United States Patent [19]
Croslin

[11] Patent Number: 5,734,811
[45] Date of Patent: Mar. 31, 1998

[54] SEGMENT SUBSTITUTION/SWAP FOR NETWORK RESTORATION PRE-PLANS

[75] Inventor: William D. Croslin, Colorado Springs, Colo.

[73] Assignee: MCI Corporation, Washington, D.C.

[21] Appl. No.: 670,872

[22] Filed: Jun. 26, 1996

[51] Int. Cl.⁶ ............................................ G06F 11/20
[52] U.S. Cl. ............................ 395/182.02; 340/827
[58] Field of Search ..................... 395/182.02; 364/944, 364/269.2, 285.1; 371/10.2; 340/827, 825.01; 370/216

[56] References Cited

U.S. PATENT DOCUMENTS

| | | | |
|---|---|---|---|
| 4,831,518 | 5/1989 | Yu et al. | 395/182.02 |
| 5,070,497 | 12/1991 | Kleine-Altekamp | 395/182.02 |
| 5,077,730 | 12/1991 | Arrowood et al. | 395/182.02 |
| 5,093,824 | 3/1992 | Coan et al. | 395/182.02 |
| 5,146,452 | 9/1992 | Pakarske | 395/182.02 |
| 5,218,601 | 6/1993 | Chujo et al. | 395/182.02 |
| 5,435,003 | 7/1995 | Chng et al. | 395/182.02 |
| 5,444,693 | 8/1995 | Arslon et al. | 395/182.02 |
| 5,463,615 | 10/1995 | Steinhorn | 395/182.02 |
| 5,509,118 | 4/1996 | Tuulos et al. | 395/182.02 |
| 5,513,345 | 4/1996 | Sato et al. | 395/182.02 |
| 5,537,532 | 7/1996 | Chng et al. | 395/182.02 |
| 5,550,805 | 8/1996 | Takatori et al. | 370/216 |
| 5,581,543 | 12/1996 | Natarajan | 395/182.02 |
| 5,590,118 | 12/1996 | Nederlof | 395/182.02 |
| 5,646,936 | 7/1997 | Shah et al. | 370/228 |
| 5,657,320 | 8/1997 | Russ et al. | 370/217 |

*Primary Examiner*—Robert W. Beausoliel, Jr.
*Assistant Examiner*—Scott T. Baderman

[57] ABSTRACT

A system and method are provided to diversely respond to changes in network topology and segment availability that occur between the time a restoration pre-plan is developed and the time it is executed. Changes that have occurred during this time are detected when the pre-plan is implemented. Dynamic responses to these network changes are manifest as real-time adjustments to the pre-plan during its execution in the form of a segment substitution or a segment swap.

28 Claims, 8 Drawing Sheets

SEGMENT SUBSTITUTION/SWAP FOR NETWORK RESTORATION PRE-PLANS

BACKGROUND OF THE INVENTION

1. Field of the Invention

The invention relates to network restoration pre-plans. In particular, the invention relates to segment substitution/swap for network restoration pre-plans.

2. Related Art

In a telecommunications network of Diverse Network Equipment (DNE), failure in the network can cause a serious disruption to customer traffic. A network failure may be a result of a transmission outage, such as a fiber cut, or a node failure, such as a loss of power to a DNE. Numerous other types of failures may occur. A disruption to traffic can be very expensive to the service provider and the customers. Therefore, telecommunications service providers employ various means of detecting failures, isolating failures, and rerouting traffic to circumvent failures.

To circumvent a network failure and restore customer traffic, a service provider must first determine a traffic restoration route, then implement that route. One common way for traffic restoration is via use of restoration pre-plans. A service provider at inception will develop predetermined network restoration plans that specify traffic restoral routes for each traffic-bearing segment in the network, along with the network commands required to implement the restoral routes. When a failure is detected on a certain segment, the restoration pre-plan that was created for that segment is called upon and implemented. This pre-plan will implement restoral routes for each traffic route that utilizes the impacted segment.

A restoration pre-plan will specify restoral routes that use various segments of network capacity. However, the topology of telecommunications networks can be very diverse, undergoing significant changes in a given period of time. These changes may be unintentional as a result of a network failure, or they may be intentional as a result of network design changes. In the time between when a restoration pre-plan for a network segment is created, and when a failure on that segment is detected, one or many other network segments that have been specified in the pre-plan as part of the restoral route may have been made unavailable. When the pre-plan is activated to implement the restoral route, these segments will not be available. In addition, a DNE failure may make some restoral route segments unavailable due to failure of certain DNE ports that support these segments.

What is needed is a way a telecommunications service provider can ensure that traffic restoral routes specified in a restoration pre-plan are successfully implemented regardless of the impacts of network topology changes.

SUMMARY OF THE INVENTION

A system and method is provided to diversely respond to changes in network topology and segment availability that occur between the time a restoration pre-plan is developed and the time it is executed. Changes that have occurred during this time are detected when the pre-plan is implemented. Dynamic responses to these network changes are manifest as real-time adjustments to the pre-plan during its execution in the form of a segment substitution or a segment swap.

The method of the invention is for restoring a failed route having a failed segment in a network. A restoration pre-plan including a restoral route having an anticipated restoration segment is executed to restore the failed segment. A real-time topology database is queried to identify a substitute segment to substitute for the failed segment if the anticipated restoration segment is unsuccessful. A substitute segment is substituted for the failed segment if the substitute segment is available. A real-time topology database is queried to identify a swappable segment for the failed segment if the substitute segment is unsuccessful in restoring the failed segment. The swappable segment is swapped for the failed segment if the swappable segment is available. If the swappable segment is unavailable the entire restoration fails.

In another embodiment of the invention, a system is provided for restoring a failed route in a network. The system includes a central processing system (CPS). The CPS is connected to the network, which comprises diverse network equipment interconnected by segments. A real-time topology database is connected to the central processing system and comprises a restoration pre-plan, a substitute segment and a swappable segment. The real-time topology database is updated in real-time to include changes in network topology, the substitute segment availability and the swappable segment availability. The system has the ability to identify a failed route having a failed segment. The system attempts to execute the restoration pre-plan to restore the failed route. The system further attempts to substitute the substitute segment for the failed segment when the restoration pre-plan fails to restore the failed route; and attempts to swap the swappable segment for the failed segment when substitution of the substitute segment is unsuccessful.

In an alternate embodiment of the invention, the invention is embodied in a program storage device.

BRIEF DESCRIPTION OF THE FIGURES

Referring now to the drawings, which form a part of this original disclosure.

DETAILED DESCRIPTION OF THE PREFERRED EMBODIMENTS

Figure 1:
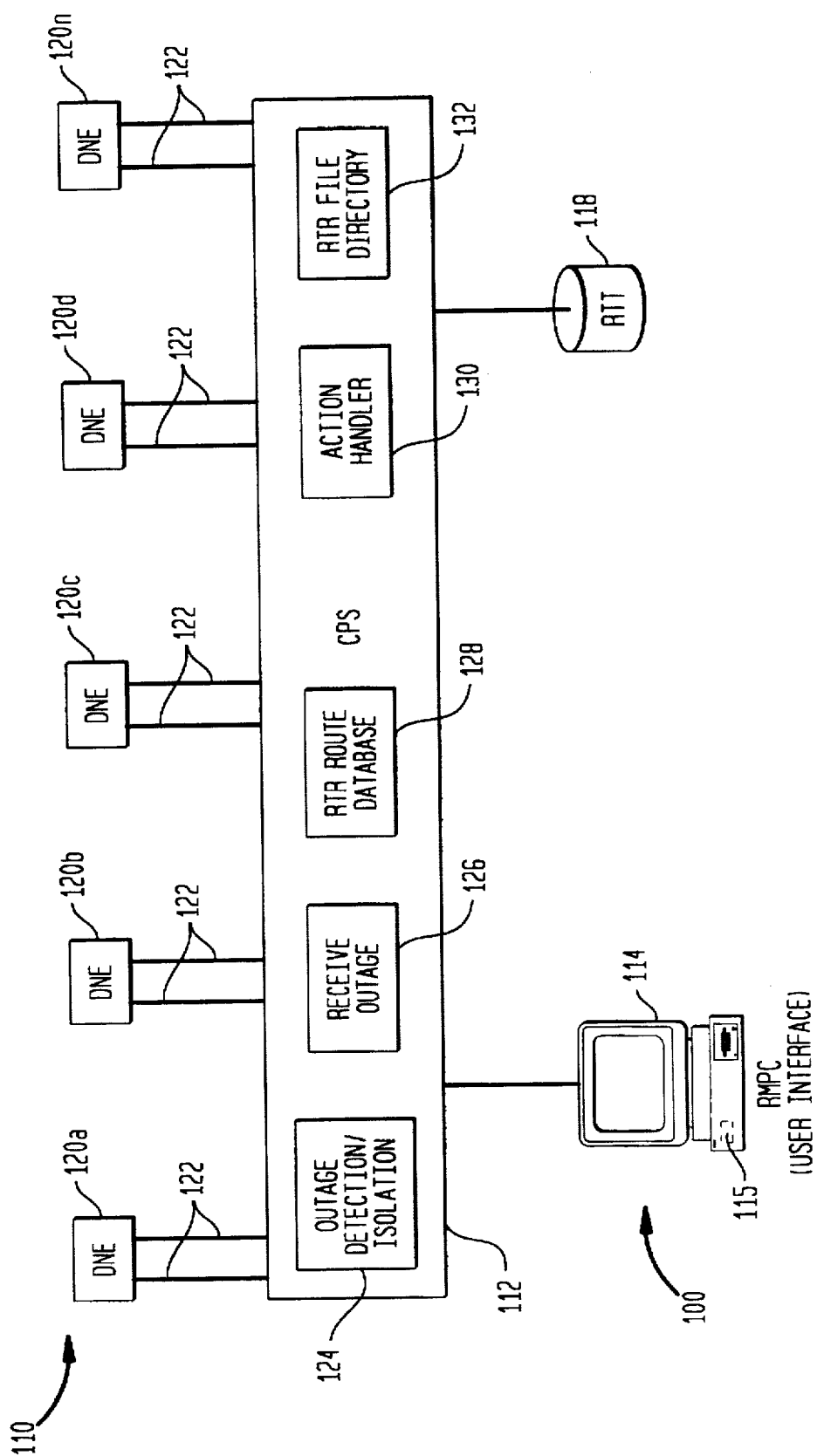
FIG. 1 is a block diagram illustrating an embodiment of the system architecture of the invention.

An embodiment of the invention is now described with reference to the figures where like reference numerals indicate identical or functionally similar elements. Also in the figures, the left most digit of each reference number corresponds to the figure in which the reference number is first used. More specific configurations and arrangements are discussed, and it should be understood that this is for illustrative purposes. A person skilled in the relevant art would recognize that other configurations and arrangements can be used without departing from the spirit and scope of the invention. It will be apparent to a person skilled in the relevant art that this invention can also be employed in a variety of other devices and applications.

The invention provides a system and method for diversely modifying restoration pre-plans, at run time, to account for changes in the availability of segments used in the pre-plans through the use of segment substitution/swap.

I. System Architecture

FIG. 1 is a block diagram illustrating an embodiment of the system architecture of the present invention shown generally at 100. System 100 includes network 110, Central Processing System (CPS) 112, Restoration Management Personal Computer (RMPC) 114, and Real-Time Topology (RTT) database 118. RMPC 114 is a computer of the type including hardware units including one or more central processing units (CPUs), a memory structure, a conventional input/output (I/O) interface and a network interface card. The memory structure and network interface card communicate via a parallel transfer over an expansion bus. RMPC 114 includes an operating system, such as DOS, Windows or UNIX and may include micro instruction code. RMPC 114 includes a program storage device 115 for storing a program for a method of restoring a failed route on network 110 as discussed in detail herein.

Network 110 consists of DNE nodes 120a ... 120n which are connected to CPS 112 via redundant control links 122. Control links 122 are conventional data communication links, such as X.25. Redundancy serves the purpose of network reliability. The interconnection among the DNE nodes 120a ... 120n is not shown in FIG. 1 and is discussed in greater detail below.

CPS 112 is a computer that consists of several program components. It may be embodied on multiple computers in a distributed architecture, or on a single computer. The program components that are embodied by CPS 112 include:

Outage Detection/Isolation 124

Receive Outage 126

Real Time Restoration (RTR) Route Database 128

Action Handler 130

RTR File Directory 132

The function of each of these programs will be described with reference to the flowcharts in FIGS. 6A, 6B and 7-9.

CPS 112 is connected to RMPC 114, which serves as a user interface. Restoration pre-plans are created on RMPC 114 and downloaded to CPS 112, where they are stored in RTR Route Database 128. When a network failure occurs on network 110, the Outage Detection/Isolation 124 detects the failure, isolates the location of the failure, and sends an outage notification message to Receive Outage 126. In an alternate embodiment, Outage Detection/Isolation 124 resides on a separate, mainframe computer and interfaces with CPS 112 via RMPC 114.

CPS 112 is also connected to RTT database 118. RTT database 118 maintains topology data for network 110 via real-time updates obtained from network 110. RTT database 118 contains data that specify which segments are spare and may be used as substitutions or as swaps for other segments.

II. Pre-plan Network Restoration

In a pre-plan methodology of network restoration in accordance with the present invention, restoral routes are categorized into three priority groups:

Priority Group 1 includes restoral routes in which implementation is fully automatic. No manual actions are needed to implement these restoral routes. Priority Group 1 restoral routes are designated in pre-plans for high-priority traffic.

Priority Group 2 includes restoral routes in which implementation requires one manual action, such as an endpoint patch. Priority Group 2 routes are designated in pre-plans for medium-priority traffic.

Priority Group 3 includes restoral routes in which implementation requires more than one manual action. Priority Group 3 routes are designated in pre-plans for low-priority traffic.

The reason for such groupings of restoral routes is so that high-priority traffic may be restored with automatic routes, which are quick to implement. Low-priority traffic may be restored with manual routes, which take longer to implement. The number of groupings and specific criteria defining each group may vary with different implementations of the pre-plan methodology.

III. Segment Substitution Overview

To execute a pre-plan, CPS 112 issues commands to appropriate DNE nodes 120a ... 120n to perform certain actions. These actions are generally to perform network switching functions, such as a cross-connect, that are needed to implement a segment that is part of the restoral route. If a command fails for any reason, the associated segment is designated by CPS 112 as unavailable. CPS 112 then queries RTT database 118 to determine another segment of spare capacity that traverses the same two DNE nodes as the unavailable segment. CPS 112 issues commands to activate this segment, thus substituting an available segment for the unavailable segment. CPS 112 will then update RTT database 118 to indicate the segment substitution that was made in the execution of the pre-plan.

Segments that are used as substitute segments are not part of another pre-plan restoral route.

IV. Segment Swap Overview

If, upon querying RTT database 118, a segment of spare capacity traversing the same two DNE nodes is not found (for use as a segment substitution), then a spare segment from a lower priority route group is "swapped" with the unavailable segment to create the restoral route. According to this method, CPS 112, upon detecting a failed command to implement a certain segment in the creation of a restoral route, first queries RTT database 118 for a substitute segment. If no such substitute segment is available, then CPS 112 queries the RTT database for a spare segment from a lower priority group.

Such a spare segment may be designated as a segment for another restoral route of lower priority, but will not require any manual actions to implement. In other words, although this spare segment is from a lower priority group route, the manual actions required for this lower priority group route are for other segments. A segment that is to be swapped must be completely automatic.

This segment from the lower priority group will be swapped with the unavailable segment from the higher priority group. The implications of this swap will, in effect, minimize the time required to implement the high-priority restoral route without increasing the time required to implement the low-priority restoral route. This is due to the following: the failed segment from the high-priority group is replaced with a working segment that, although from a low-priority group, requires no manual actions to implement. Thus, the time required to implement the high-priority route is minimized. Additionally, it is generally true that the time required to fix the problems that caused the segment from the high-priority group to fail will be less than the time required to execute the manual actions in implementing the low-priority group restoral route. Therefore, although the low-priority group now has a failed segment that requires time to fix, this time will be less than the time needed to implement the overall route. Thus, the time required to implement the low-priority restoral route is not increased.

V. High Level Illustration of Segment Substitution/Swap

For purposes of illustration, assume segment 1 is designated in a restoration pre-plan as part of a Priority Group 1 restoral route for certain high-priority traffic. Also suppose segment 2 has the same endpoints as segment 1, is designated as spare capacity, and is not part of the restoral pre-plan. Further suppose that segment 3 has the same endpoints as segment 1, is designated as spare capacity, and is designated as part of a restoral pre-plan for a Priority Group 3 route.

When a network failure occurs, CPS 112 calls up the appropriate pre-plan, referenced by the location of network failure. This pre-plan contains commands to implement restoral routes for each traffic route impacted by the network failure. Segment 1 is identified in this pre-plan as part of a Priority Group 1 restoral route.

CPS 112 issues commands to implement each segment of the restoral route, in accordance with the pre-plan. When the commands to implement segment 1 are issued, one of them fails, perhaps due to a bad port on a DNE. CPS 112 detects this failure through conventional means. CPS 112 then designates segment 1 as unavailable.

CPS 112 then queries RTT database 118 for another spare segment that can be substituted for segment 1. Segment 2 is found available. CPS 112 will issue commands to implement segment 2 as part of the restoral route. If segment 2 implements successfully, CPS 112 updates RTT database 118 to indicate that segment 2 has been substituted for segment 1 in this particular restoral route.

Now suppose that segment 2 was either not found in RTT database 118, was found but unavailable, or failed to implement. CPS 112 will query RTT database 118 for a "swappable" segment. That is to say, CPS 112 will query RTT database 118 for spare segments from routes in lower priority groups, regardless of whether they are already part of the restoral pre-plan. CPS 112 finds that segment 3 in Priority Group 3 is spare, even though it is part of another pre-plan route, and available. CPS 112 will swap segment 3 with segment 1. That is to say, CPS 112 will issue commands to implement segment 3 as part of the high-priority restoral route, and will then update RTT database 118 to indicate that Segment 3 is part of the high-priority restoral route and the unavailable segment 1 is part of the low-priority restoral route.

As a result of this segment swap, segment 3, which can be successfully and automatically implemented, is now a part of the high-priority restoral route. Therefore, the high-priority restoral route can be quickly implemented, rather than depending on a repair to segment 1. Segment 1 is now a part of the low-priority restoral route, but does not add to the time needed to implement this route. This is became the time needed to repair segment 1 will be much less than the time needed to execute the manual actions that are required to implement a low-priority route.

The following table summarizes the above described examples.

|  | Priority Group 1 | Priority Group 2 | Priority Group 3 | Not Part of Restoral Pre-Plan | Not Used or Unavailable Segments |
|---|---|---|---|---|---|
| Restoral Pre-Plan Set-Up |  |  |  |  |  |
| Segment 1 | S$_1$ |  |  |  |  |
| Segment 2 |  |  |  | S$_2$ |  |
| Segment 3 |  |  | S$_3$ |  |  |
| Segment Substitution |  |  |  |  |  |
| Segment 1 | S$_1$ — | — | — | — | → S$_1$ |
| Segment 2 | S$_2$ ← | — | — | — S$_2$ |  |
| Segment Swap |  |  |  |  |  |
| Segment 1 | S$_1$ — | — | → S$_1$ |  |  |
| Segment 3 | S$_3$ ← | — | — S$_3$ |  |  |

VI. The Network of DNE Nodes

FIGS. 2–5 are block diagrams of a network of DNE nodes. These figures illustrate the different scenarios in which the present invention operates.

Figure 2:
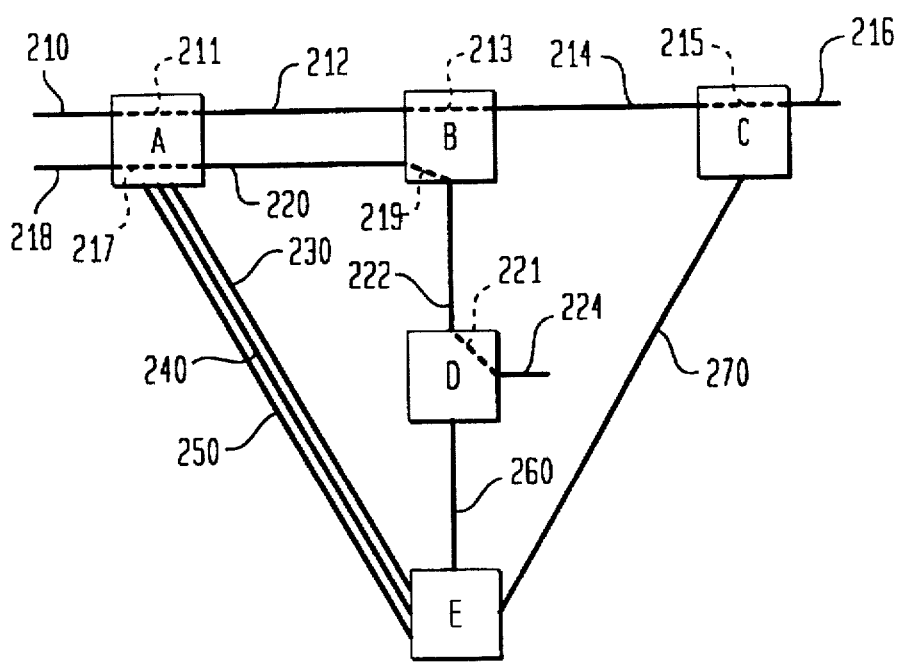
FIG. 2 shows a block diagram illustrating a simplified network of DNE nodes in an original network configuration.

FIG. 2 illustrates a configuration of a simplified network of DNE nodes. Nodes A, B, C, D, and E represent DNE nodes, which may be conventional digital cross-connects or switches. Links between each node are referred to as segments, and represent trunks that may be traffic-bearing or spare capacity. In the following discussion, even number reference numerals are used to refer to segments. Traffic bearing segments are shown by reference numerals 210, 212, 214, 216, 218, 220, 222, and 224. Spare segments are shown by reference numerals 230, 240, 250, 260, and 270. Odd-numbered reference numerals are used to refer to cross-connects between two ports on a single DNE node. Cross-connects are shown by reference numerals 211, 213, 215, 217, 219 and 221. A cross-connect effectively connects two segments to create part of an end-to-end traffic route. For example, cross-connect 211 in Node A connects segment 210 with segment 212. Likewise, cross connect 213 in Node B connects segment 212 with segment 214 and cross connect 215 in Node C connects segment 214 with segment 216. In this manner, a traffic bearing route is created with segments 210, 212, 214, and 216, and with cross-connects 211, 213, and 215. This route is referred to as Route 1. Opposite endpoints of segments 210 and 216 are not shown in FIG. 2 or discussed herein and are understandable to one of ordinary skill in the art. For convenience, Route 1 is defined as follows:

Route 1: 210-211-212-213-214-215-216

Another traffic-bearing route is created with segments 218, 220, 222, and 224, and with cross-connects 217, 219, and 221. This route is referred to as Route 2. Again, opposite endpoints of segments 218 and 224 are not shown in FIG. 2 or discussed herein. Route 2 is defined as follows:

Route 2: 218-217-220-219-222-221-224

Segments 230, 240, 250, 260, and 270 are spare segments and are designated as such in RTT database 118.

Figure 3:
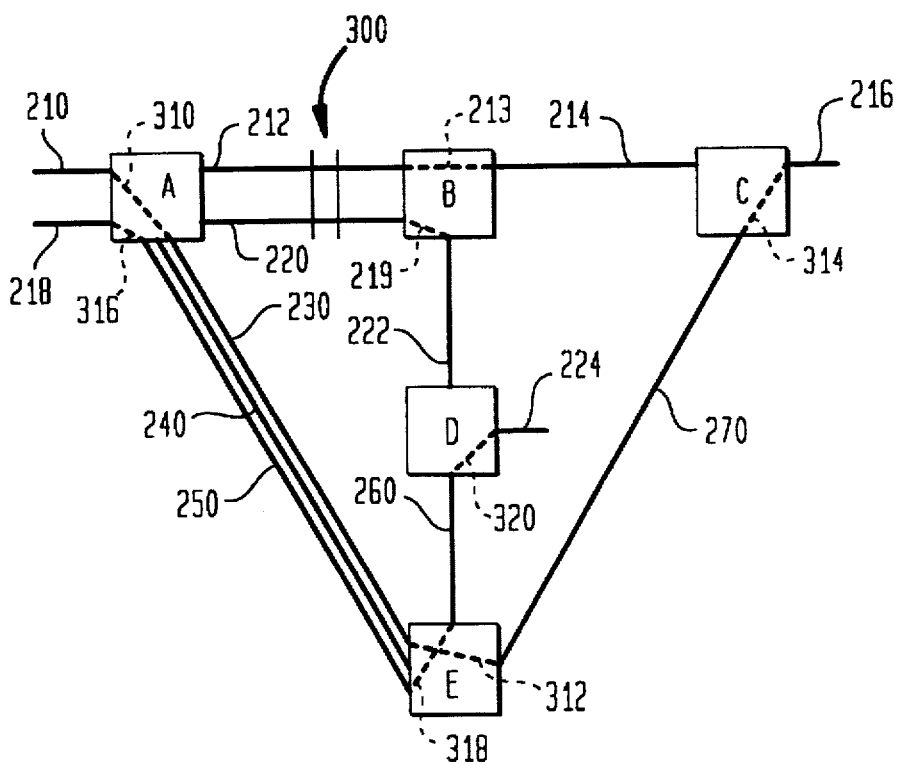
FIG. 3 shows a block diagram illustrating a restoration pre-plan of the network configuration shown in FIG. 2.

Referring to FIG. 3, the network configuration of the restoral routes for Route 1 and Route 2 are shown. These restoral routes will be implemented with the execution of restoration pre-plans for Route 1 and Route 2, in the event of a network failure, such as a transmission outage shown in FIG. 3 by double bars 300. This outage 300 impacts both Route 1 and Route 2, as shown. Assume Route 1 carries high-priority traffic, such as network control traffic. The restoral route for Route 1 must be a Priority Group 1 route, which means all commands required for its implementation are automatic.

The restoral route for Route 1 is created with segments 210, 230, 270, and 216, and with cross-connects 310, 312, and 314. This is referred to as Route 3:

Route 3: 210-310-230-312-270-314-216

Also assume that Route 2 carries low-priority traffic. The restoral route for Route 2 may be a Priority Group 3 route, which means more than one manual action is required for its implementation.

The restoral route for Route 2 is created with segments 218, 250, 260, and 224, and with cross-connects 316, 318, and 320. This is referred to as Route 4:

Route 4: 218-316-250-318-260-320-224

Segment 240 is a spare segment that shares the same endpoints (Node A and Node E) as segments 230 and 250, but is not part of a restoral route specified in a restoration pre-plan.

When outage 300 is detected and isolated, and it is determined that traffic Route 1 and Route 2 require restoral, CPS 112 calls up the pre-plans for Route 1 and Route 2. The pre-plan for Route 1 specifies commands needed to implement Route 3, and the pre-plan for Route 2 specifies commands needed to implement Route 4. CPS 112 then issues these commands to the DNE nodes A, B, C, D, and E in network 110. DNE nodes A, B, C, D, and E execute the commands to implement the restoral routes. Since route 1 is high-priority, CPS 112 executes its pre-plan first, implementing Route 3 from Priority Group 1. Route 2 is low-priority; CPS 112 executes its pre-plan second, implementing Route 4 from Priority Group 3.

Figure 4:
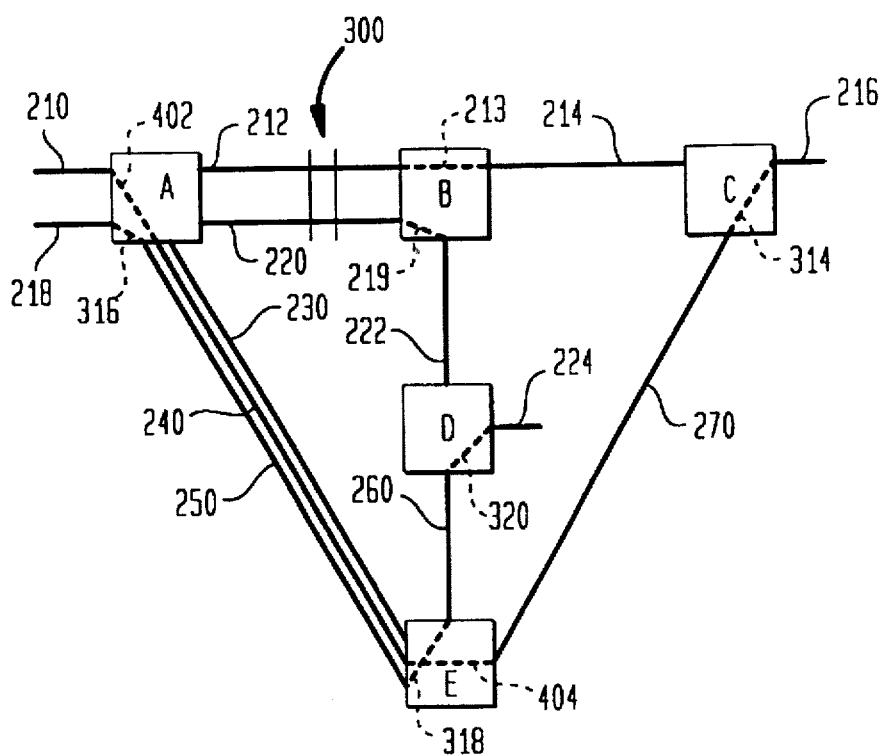
FIG. 4 shows a block diagram illustrating a segment substitution of the network configuration shown in FIG. 2.

Referring now to FIG. 4, a possible scenario that occurs during the implementation of Route 3 is shown to illustrate the operation of the present invention. Segment 230, which is used in Route 3 to restore traffic for Route 1, is found to be unavailable. Its unavailability is determined when a command issued to Node A to implement cross-connect 310, or a command issued to Node E to implement dross-connect 312, falls. Upon this determination, CPS 112 will designate segment 230 as unavailable, and will proceed to perform a segment substitution.

CPS 112 will query RTT database 118 to find a spare segment with the same endpoints—Node A and Node E. This spare segment must not be part of another restoral route. This information is maintained within RTT database 118.

Upon RTT query, segment 240 is found to meet the requirements for a segment substitution for segment 230. CPS 112 will issue commands to Node A to perform cross-connect 402 and to Node E to perform cross-connect 404. In this manner, a new restoral route for Route 1 is created with segments 210, 240, 270, and 216, and with cross-connects 402, 404, and 314. This is referred to as Route 5:

Route 5: 210-402-240-404-270-314-216

CPS 112 will then update RTT database 118 to indicate that segment 240 was substituted for segment 230 in the execution of the pre-plan for Route 1. It will indicate Route 5 as the active restoral route for Route 1.

Figure 5:
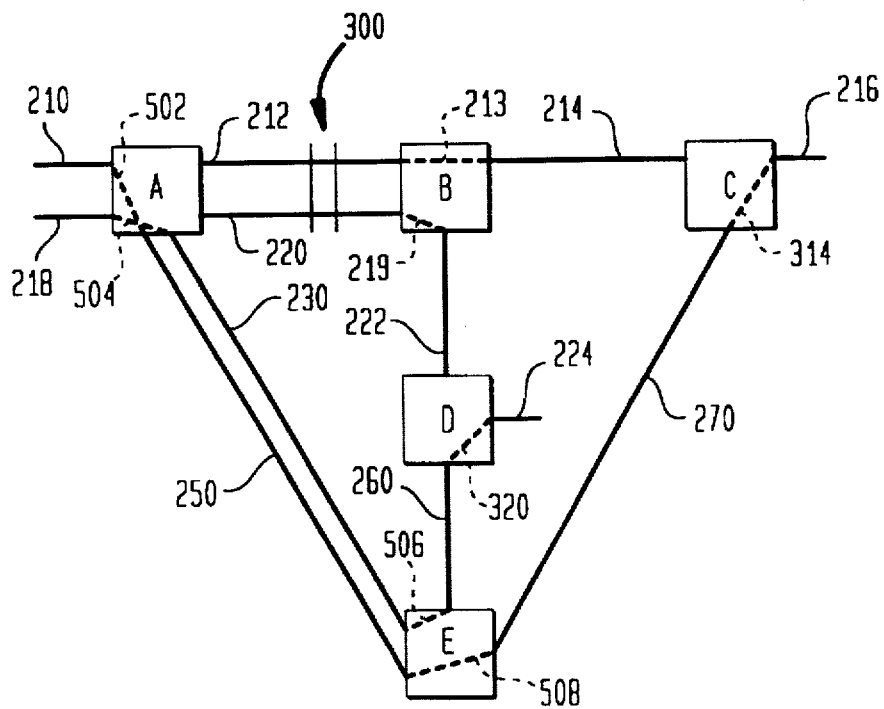
FIG. 5 shows a block diagram illustrating a segment swap of the network configuration shown in FIG. 2.

Referring now to FIG. 5, another embodiment is illustrated. Assume that during the segment substitution routine just described with reference to FIG. 4, segment 240 was either unavailable or non-existent, as shown in FIG. 5. Then CPS 112 will perform a segment swap to implement a restoral route for Route 1. In this example, segment 250, which is part of a Priority Group 3 route to restore Route 2, is swapped with segment 230, which is part of a Priority Group 1 route to restore Route 1 but is unavailable.

CPS 112 issues commands to Node A to perform cross-connects 502 and 504, and to Node E to perform cross-connects 506 and 508. In this manner, a new restoral route for Route 1 is created with segments 210, 250, 270, and 216, and with cross-connects 502, 508, and 314. This is referred to as Route 6:

Route 6: 210-502-250-508-270-314-216

Now Route 6 contains segment 250, which will be automatically implemented and will require less time than that needed to repair segment 230. Thus, the time to implement the restoral route for high-priority Route 1 is minimized.

Likewise, a new restoral route for Route 2 is created with segments 218, 230, 260, and 224, and with cross-connects 504, 506, and 320. This is referred to as Route 7:

Route 7: 218-504-230-506-260-320-224

Route 7 contains segment 230, which is unavailable due to some problems. By performing the swap, the time needed to fix this problem has been transferred as an implementation requirement from restoral of high priority Route 1 to restoral of low-priority Route 2. However, if Route 7 requires manual actions to implement (i.e., if Route 7 is a Priority Group 2 or 3 route), these manual actions will require greater time than that needed to repair segment 230. Thus, the impact of moving segment 230 into this route will be negligible.

Figure 6A:
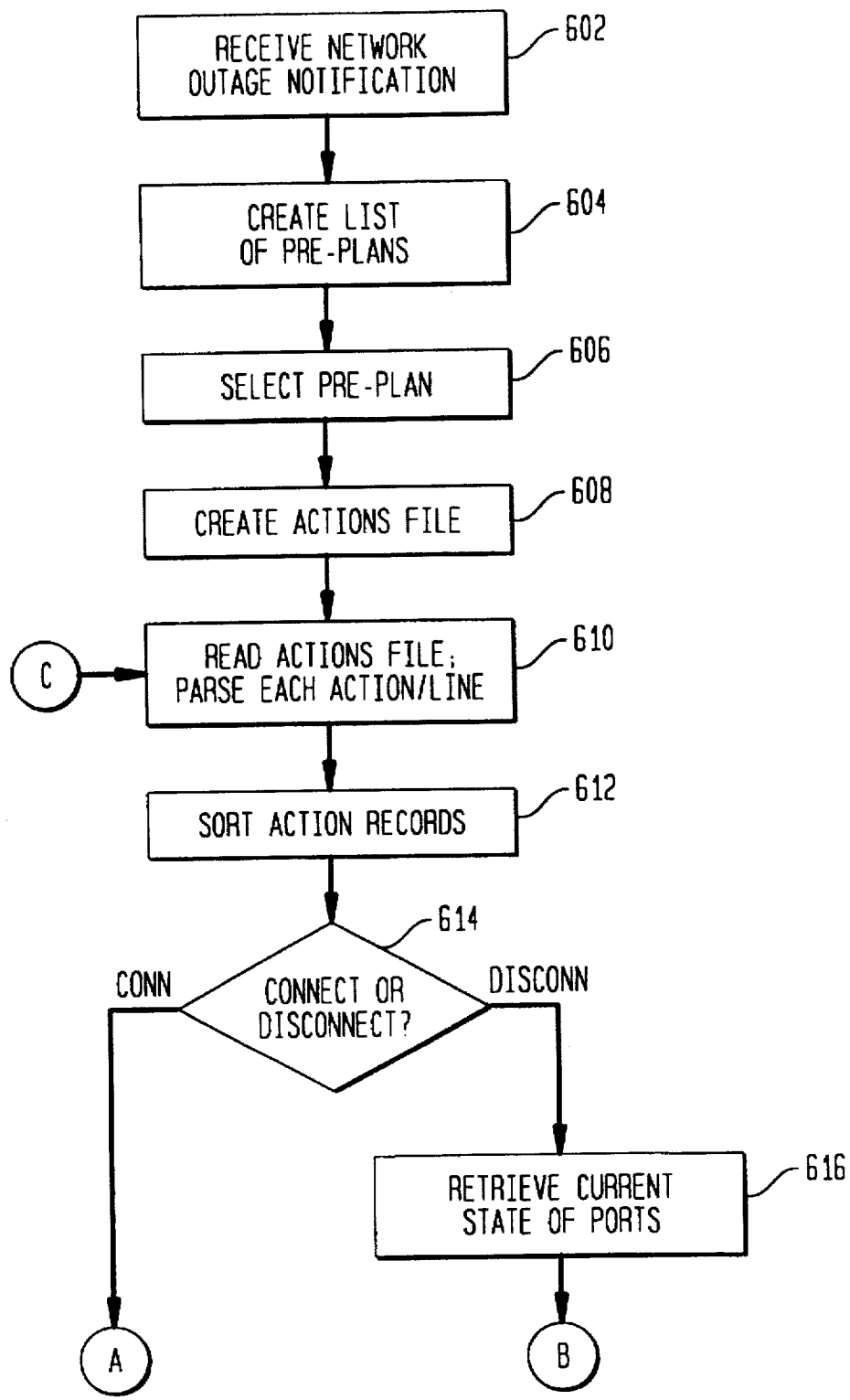
FIGS. 6A and 6B show a process flowchart illustrating a restoration pre-plan methodology utilizing segment substitution/swap.
Figure 6B:
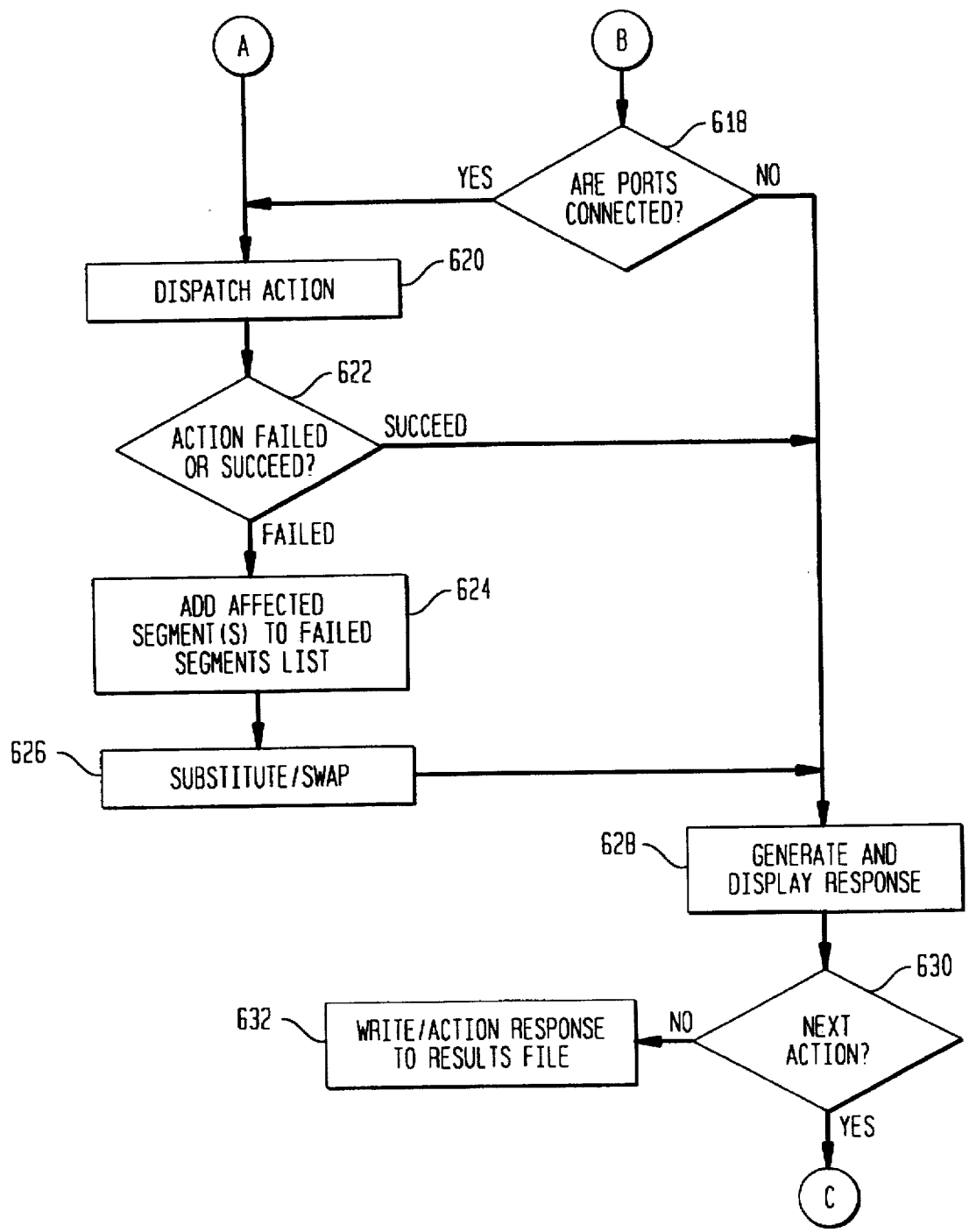

FIGS. 6A and 6B show a process flowchart illustrating the restoration pre-plan methodology utilizing segment substitution/swap. In step 602, the Receive Outage component of CPS 112 receives an outage notification from Outage Detection/Isolation 124. This notification will identify the network segment(s) that have been impacted by the outage, in accordance with standard network outage detection and isolation methodologies. It will also identify the traffic route(s) that have been impacted. For example, referring to FIG. 3, the outage notification will identify segments 212 and 220, and Routes 1 and 2, as impacted.

In step 604, a list of pre-plans that may restore impacted traffic is retrieved from RTR Route Database 118, and sent to RMPC 114. In step 606, a user at RMPC 114 may select a pre-plan from the list, or alternatively a pre-plan may be automatically selected.

In step 608, the selected pre-plan is sent back to CPS 112, where Receive Outage 126 receives the pre-plan and creates an Actions File that specifies the commands needed to execute the pre-plan. The Actions File is then retrieved by Action Handler 130 and copied into the RTR File Directory 132.

In step 610, Actions Handler 130 reads and parses each line from the Actions File to create actions records that identify each connect or disconnect action, the equipment, and the ports to apply the action to. An action is a command to a specific DNE to either make a connection between two ports (i.e., a cross-connect), or to disconnect two connected ports. These connects and disconnects are intended to ultimately build a traffic restoral route, such as those described with reference to FIG. 3.

Each line is read and parsed until all actions are read from the Actions File. Action Handler 130 then sorts all the action records in step 612.

In decision step 614, each action is determined to be a connect or disconnect action. If it is a disconnect action, the current state of the specified ports is retrieved from RTT Database 118 in step 616. If the ports are not connected, as determined in decision step 618, then the disconnect action is not taken and a response is generated in step 628 indicating that no action was taken.

If the ports are connected, as determined in step 618, or the action read is a connect action, as determined in step 614, then the action is dispatched as a command to the appropriate DNE node in network 110 in step 620.

In decision step 622, CPS 112 receives a response from network 110 indicating whether the action failed or succeeded. If the action succeeded, a response is generated in step 628 indicating such, and the process proceeds to the next action. If the action failed, then the affected segment is added to a Failed Segments List in step 624. The affected segment is identified by the type of action (connect or disconnect) and the ports the action was applied to. If the action is a connect command, then generally one port is affected, although sometimes both ports may be. If the action is a disconnect, then both ports are always affected. The segment that is attached to each affected port is identified as "affected" and added to the Failed Segments List. The data to identify segments attached to affected ports are obtained from RTT Database 118. RTT Database 118 also provides the end nodes for each affected segment. These will be needed to identify substitutable/swappable segments.

In step 626, a segment that can be substituted or swapped is found. This process is shown in greater detail in FIG. 7. A response is then generated in step 628.

In decision step 630, if there is another action in the sorted Actions File, the process proceeds to step 610, where the next action is read and parsed. If no more actions remain, then all actions taken and responses generated are written to a Results File for user presentation and analysis in step 632.

Figure 7:
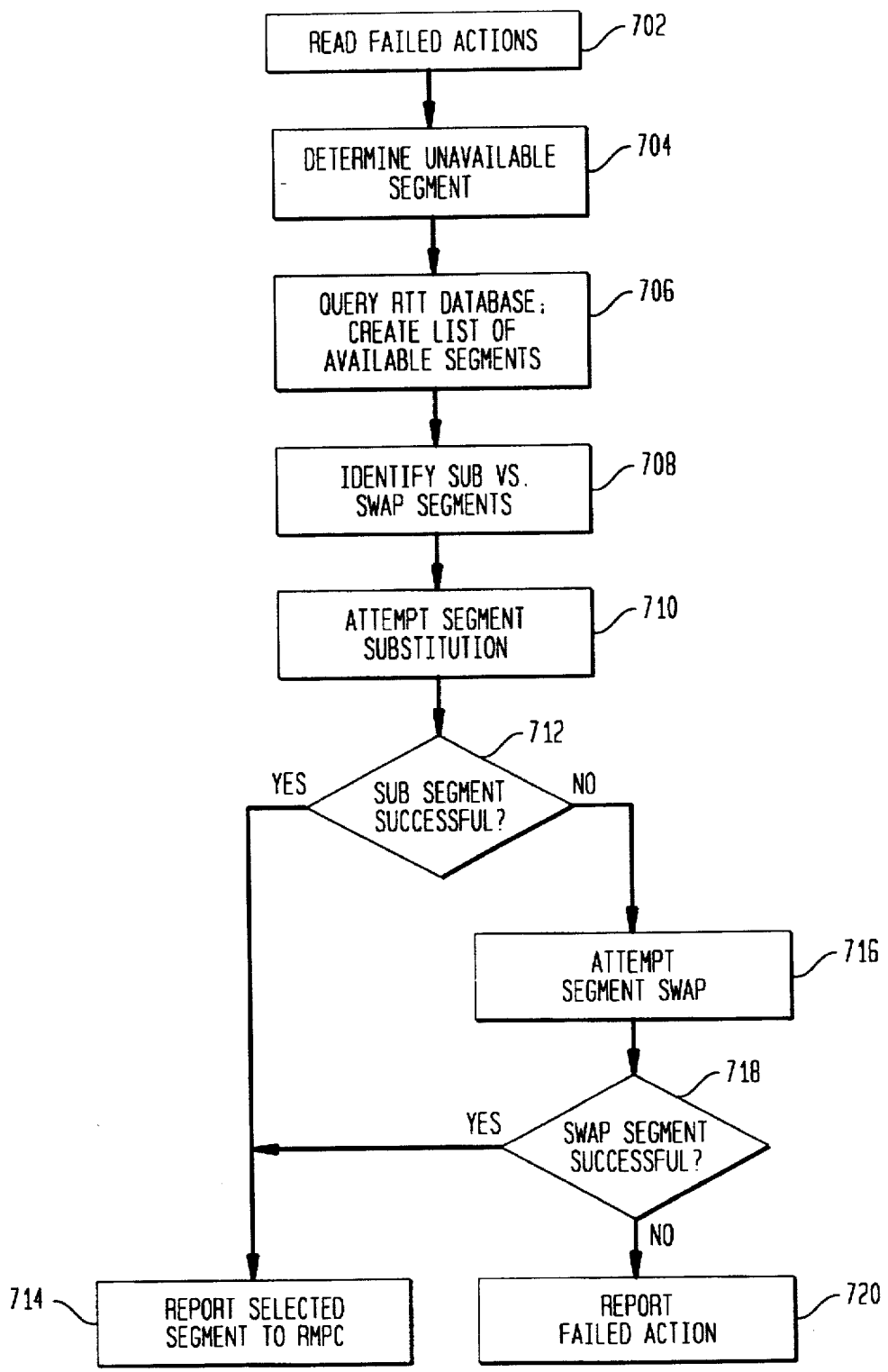
FIG. 7 is a flowchart illustrating the high level process of the segment substitution/swap process shown in step 626 in FIG. 6B.

FIG. 7 is a flowchart illustrating the high-level process of the segment substitution/swap process shown in step 626 in FIG. 6B. In step 702, the actions that failed are read and analyzed to determine the segments that need to be replaced. These segments are determined in step 704 by querying the RTT Database 118 to identify those attached to each affected port. The affected port can be identified from the failed action response received from the network 110 in step 622. Segments are identified in RTT Database 118 by their end ports and end nodes. The failed segments can thus be identified by querying RTT Database 118 with the affected ports to determine which segments are supported by these ports.

In step 706, CPS 112 will perform another query of RTT Database 118 to identify all segments that are available as a substitute or swap for each affected segment. These available segments will be found in RTT Database 118 as those that are spare and with the same end nodes as the affected trunks. In step 708, each available segment is designated as a substitute or a swap. Spare segments that are not already part of the pre-plan are designated substitute. Spare segments from a lower priority group are designated swap.

In step 710, a segment substitution is attempted. This process is shown and discussed in greater detail with reference to FIG. 8. In decision step 712, it is determined whether the segment substitution was successful. If this process succeeds in selecting a substitute segment, then in step 714 the selected segment is reported to RMPC 114. If this process fails in selecting a substitute segment, then in step 716 a segment swap is attempted. This process is shown and discussed in greater detail with reference to FIG. 9. In decision step 718, it is determined whether the segment swap was successful. If this process succeeds in selecting a swap segment, then in step 714 the selected segment is reported to RMPC 114. If this process fails in selecting a swap segment, then in step 720 it is reported that the overall action to execute the specific pre-plan failed.

Figure 8:
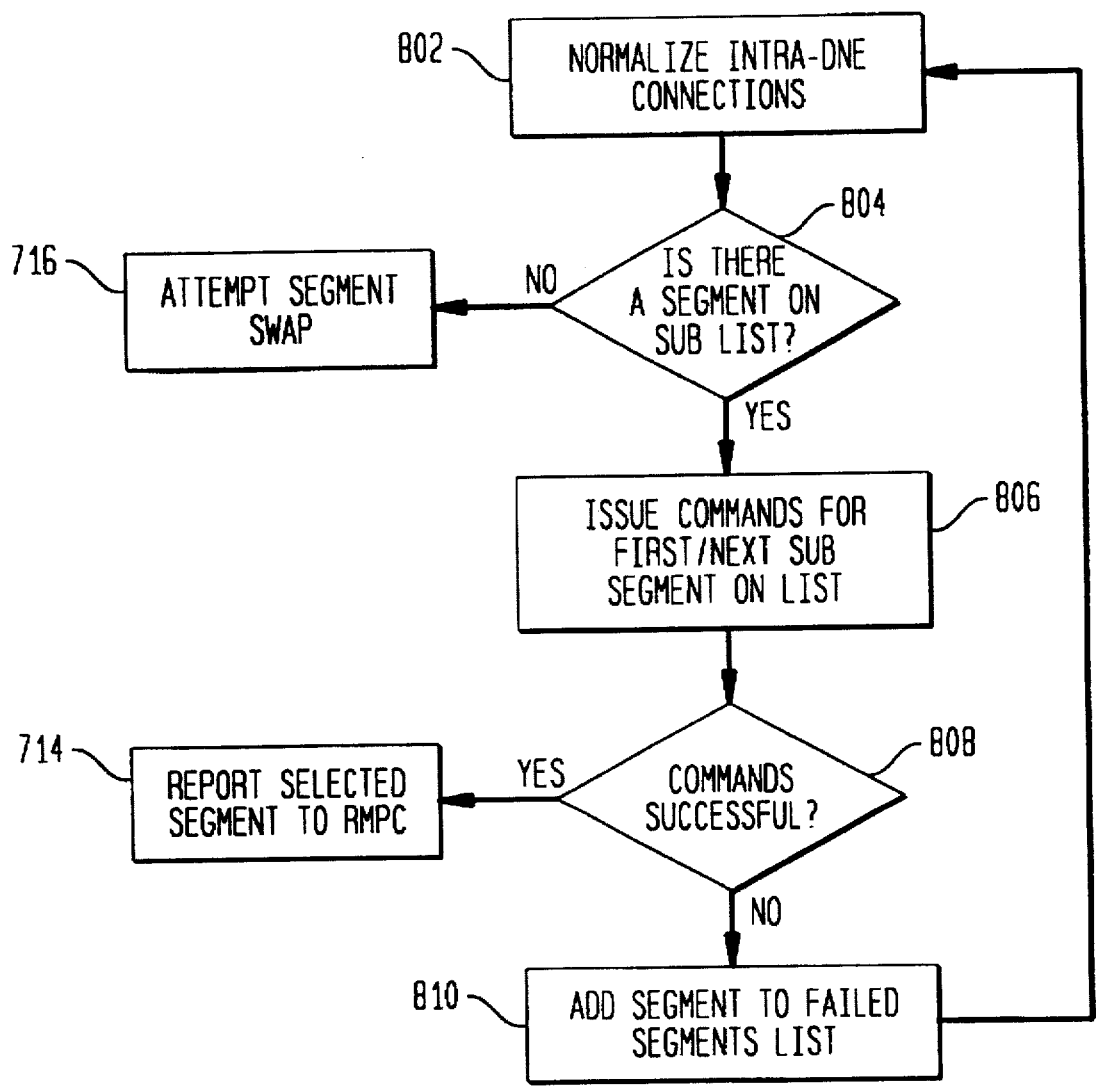
FIG. 8 is a flowchart illustrating the segment substitution process of step 710 shown in FIG. 7.

FIG. 8 is a flowchart illustrating the segment substitution process of step 710. To begin, in step 802, the intra-DNE connections of the far end of the failed ports are normalized by issuing a disconnect to the far end DNE. With reference to FIG. 3, if a command issued to Node A to execute connection 310 fails, then segment 230 is added to Failed Segment List. To normalize, a command is issued to Node E to disconnect connection 312.

In step 804, a candidate substitute segment is read from the list created in steps 706 and 708. If a candidate substitute segment is found, then in step 806, commands are issued to network 110 to implement that segment. If, in step 808, these commands are successful, then the selected segment is reported to RMPC 114 as a substitute, as indicated in step 714. If, in step 808, any of these commands fail, then the segment is added to the Failed Segment List in step 810. The process returns to step 802 to normalize the intra-DNE connection of the far end and search for another candidate substitute segment.

If in step 804 no more substitute segments remain in the list (the list created in steps 706 and 708), then the process proceeds to step 716 to attempt a segment swap.

Figure 9:
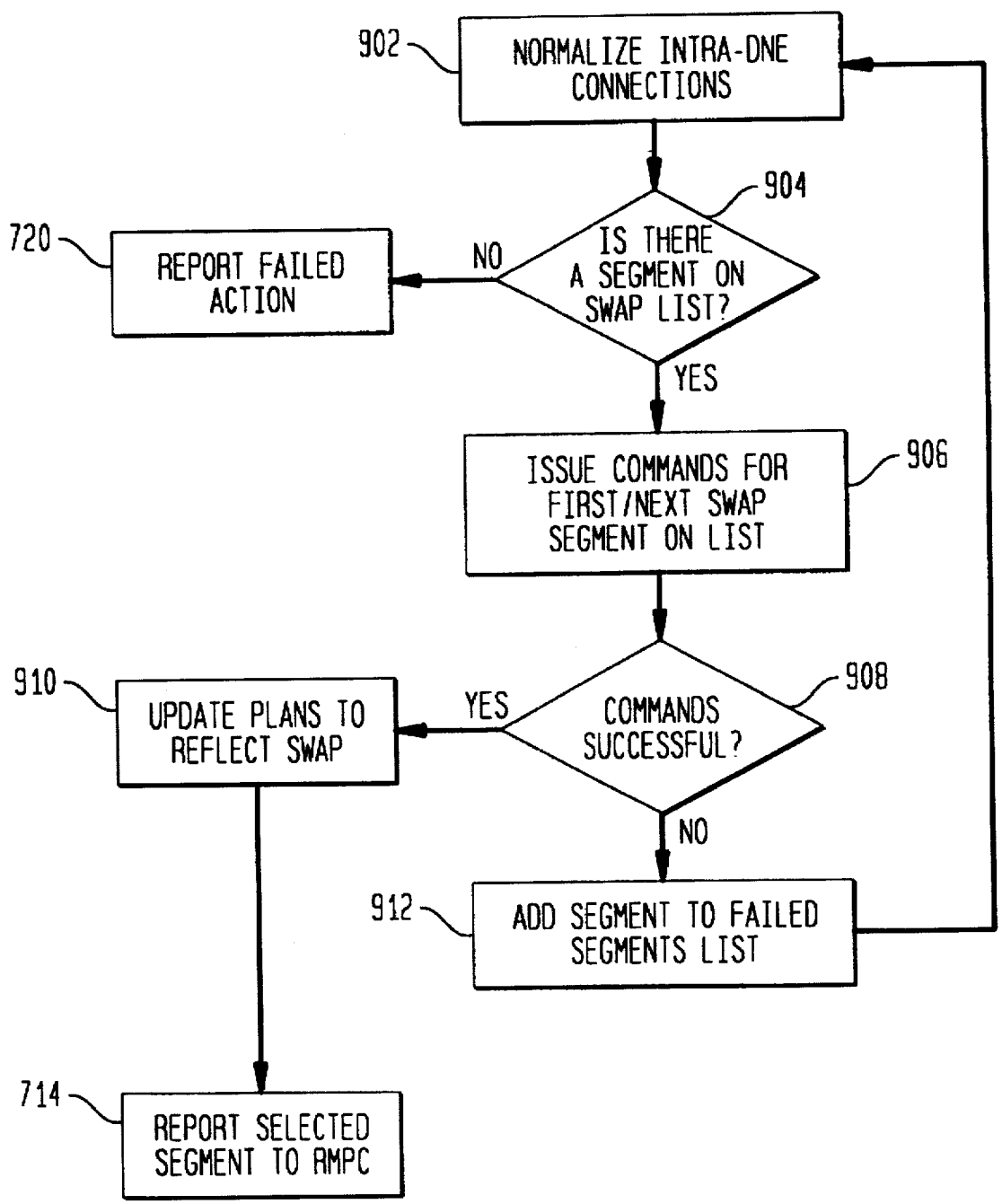
FIG. 9 is a flowchart illustrating the segment swap process of step 716 is FIG. 7.

FIG. 9 is a flowchart illustrating the segment swap process of step 716. In step 902, the intra-DNE connections of the far end of the failed ports are normalized, as in step 802.

In step 904, a candidate segment swap is read from the list created in steps 706 and 708. If a candidate swap is found, then in step 906, commands are issued to network 110 to implement that segment. If, in step 908, these commands are successful, then in step 910 the pre-plan route that utilized the swapped segment is updated to include the segment that failed. The segment that failed will be from a higher priority group route than the swapped segment. In step 714, the swapped segments are reported as such to RMPC 114.

If, in step 908, any of these commands fail, then the segment is added to the Failed Segment List in step 912. The process returns to step 902 to normalize the intra-DNE connection of the far end and search for another candidate swap.

If in step 904 no more swappable segments remain in the list (the list created in steps 706 and 708), then the process proceeds to step 720 to report that the overall action to execute the pre-plan route failed.

VII. Alternate Embodiments

The pre-plan methodology can be used as a backup restoration methodology to real-time restoration in accordance with the present invention. Because network topology changes frequently, the use of the present invention is vital in assuring that execution of pre-plans is completed quickly in the event of a network outage. The invention will be similarly important to any carrier that utilizes the pre-plan methodology.

While advantageous embodiments have been chosen to illustrate the invention, it will be understood by those skilled in the art that various changes and modifications can be made therein without departing from the scope of the invention as defined in the appended claims.

What is claimed is:

1. A method for restoring a failed route in a network including diverse network equipment interconnected by segments, comprising the steps of:

(1) identifying a failed segment in the failed route;

(2) executing a restoration pre-plan including an anticipated restoration segment;

(3) generating a successful response if said restoration pre-plan executes successfully to restore the failed route;

(4) adding said anticipated restoration segment to a failed segment list in a real-time topology database if said restoration pre-plan executes unsuccessfully; and (5) identifying an alternate restoration segment from said real-time restoration database to replace said failed segment if said restoration pre-plan executes unsuccessfully, wherein said alternate restoration segment can be one of a substitute segment and a swap segment, said swap segment being part of a restoral route for a traffic route that is in a lower priority route group than said failed segment.

2. A method according to claim 1, wherein step (5) comprises the steps of:

(a) identifying spare segments that can be substituted and swapped for said failed segment;

(b) attempting substitution of a candidate spare substitutable segment for said failed segment;

(c) implementing said candidate spare substitutable segment if step (b) is successful;

(d) attempting a swap of a candidate spare swappable segment for said failed segment if step (c) is unsuccessful;

(e) implementing said candidate spare swappable segment if step (d) is successful; and (f) reporting route restoration failure if step (d) is unsuccessful.

3. A method according to claim 2, wherein step (b) comprises the steps of:

attempting a substitution of all said spare segments prior to performing step (d); and the method comprises the steps of:
reporting success to a user interface if step (c) is successful; and
normalizing intra-diverse network equipment connections that are affected when step (c) is performed.

4. A method according to claim 2, wherein step (d) comprises the steps of:

attempting a swap of all said spare segments prior to performing step (f); and the method comprises the steps of:
reporting success to a user interface if step (e) is successful; and
normalizing intra-diverse network equipment connections that are affected when step (e) is performed.

5. A method according to claim 1, comprising the step of:

identifying additional routes affected by the failed route and identifying each failed segment in the failed route and said additional routes; and including each failed segment in a failed segments list in said real-time topology database.

6. A method according to claim 1, comprising the steps of:
creating a list of restoration pre-plans; and
selecting said restoration pre-plan for execution in step (2).

7. A method according to claim 1, comprising the step of:
processing an actions file specifying commands needed to execute said restoration pre-plan.

8. A method according claim 1, comprising the steps of:
detecting changes to network topology and segment availability; and
updating a failed segments list in said real-time topology database each time a failed segment is identified.

9. A method for restoring a failed route having a failed segment in a network, comprising the steps of:

(1) executing a restoration pre-plan including a restoral route having an anticipated restoration segment to restore the failed segment;

(2) querying a real-time topology database to identify a substitute segment to substitute for the failed segment if said anticipated restoration segment is unsuccessful;

(3) substituting said substitute segment for the failed segment if said substitute segment is available;

(4) querying said real-time topology database to identify a swappable segment for the failed segment if said substitute segment is unsuccessful in restoring the failed segment; and (5) swapping said swappable segment for the failed segment if said swappable segment is available.

10. A method according to claim 9, wherein said restoration pre-plan comprises a plurality of restoral routes and said real-time topology database comprises a plurality of substitute segments and swappable segments, and the method comprises the steps of:

prioritizing each one of said restoral routes into one of a high-priority traffic group, a medium-priority traffic group and a low-priority traffic group;

step (2) comprises the step of:
identifying a substitute segment having the same endpoints as the failed segment, and step (4) comprises the step of:
identifying a swappable segment that is part of a restoral route for a traffic route that is in a lower priority group than the failed route.

11. A method according to claim 9, comprising the step of:
performing network switching functions necessary to implement said substitute segment and said swappable segment.

12. A method according to claim 9, comprising the step of:
normalizing intra-diverse network equipment connections that are affected when steps (3) and (5) are performed.

13. A method according to claim 10, comprising the step of:
identifying said substitute segments as segments that fail to be a part of said plurality of restoration pre-plans.

14. A method according to claim 9, comprising the steps of:
providing notification of an inability to restore the failed route when said swappable segment is unavailable.

15. A method according to claim 9, wherein step (2) comprises the steps of:

(a) querying said real-time topology database to identify another substitute segment for the failed segment;

(b) attempting to substitute said another substitute segment if said substitute segment is unavailable prior to performing steps (4) and (5); and (c) repeating steps (a) and (b) until all substitute segments for said failed segment have been exhausted.

16. A method according to claim 9, wherein step (4) comprises the steps of:

(a) querying said real-time topology database to identify another swappable segment for the failed segment;

(b) attempting to swap said another swappable segment if said swappable segment is unavailable; and (c) repeating steps (a) and (b) until all swappable segments for said failed segment have been exhausted.

17. A system for restoring a failed route in a network, comprising:

a central processing system, wherein the network is connected to said central processing system and comprises diverse network equipment interconnected by segments;

a real-time topology database connected to said central processing system comprising a restoration pre-plan, a substitute segment and a swappable segment, wherein said real-time topology database is updated in real-time to include changes in network topology, said substitute segment availability and said swappable segment availability;

means for identifying the failed route having a failed segment;

means for attempting to execute said restoration pre-plan to restore said failed route;

means for attempting to substitute said substitute segment for said failed segment when said restoration pre-plan fails to restore said failed route; and means for attempting to swap said swappable segment for said failed segment when substitution of said substitute segment is unsuccessful.

18. A system according to claim 17, comprising:

a user interface connected to said central processing system; and a means for reporting one of successful and unsuccessful restoration of the failed route to said user interface.

19. A system according to claim 17, wherein said restoration pre-plan includes a plurality of restoral routes each of which is prioritized into one of a high-priority traffic group, a medium-priority traffic group and a low priority traffic group, and said means for attempting to substitute attempts to substitute a substitute segment having the same endpoints as the failed segment, and said means for attempting to swap attempts to swap a swappable segment that is part of a restoral route for a traffic route that is in a lower priority group than the priority group of a restoral route for the failed route.

20. A system according to claim 17, wherein said central processing system includes a outage detector and isolator, an outage receiver, a RTR route database, an action handler, and a RTR file directory.

21. A program storage device readable by a machine, tangibly embodying a program of instructions executable by the machine to perform method steps for performing restoration of a failed route in a network, said method steps comprising:

(1) executing a restoration pre-plan including a restoral route having an anticipated restoration segment to restore the failed segment;

(2) querying a real-time topology database to identify a substitute segment to substitute for the failed segment if said anticipated restoration segment is unsuccessful;

(3) substituting said substitute segment for the failed segment if said substitute segment is available;

(4) querying said real-time topology database to identify a swappable segment for the failed segment if said substitute segment is unsuccessful in restoring the failed segment; and (5) swapping said swappable segment for the failed segment if said swappable segment is available.

22. A program storage device according to claim 21, wherein said restoration pre-plan comprises a plurality of restoral routes and said real-time topology database comprises a plurality of substitute segments and swappable segments, and step (1) comprises the steps of:

prioritizing each one of said restoral routes into one of a high-priority traffic group, a medium-priority traffic group and a low-priority traffic group;

step (2) comprises the step of:

identifying a substitute segment having the same endpoints as the failed segment, and step (4) comprises the step of:

identifying a swappable segment that is part of a restoral route for a traffic route that is in a lower priority group than the failed route.

23. A program storage device according to claim 21, comprising the step of:

performing network switching functions necessary to implement said substitute segment and said swappable segment.

24. A program storage device according to claim 21, comprising the step of:

normalizing intra-diverse network equipment connections that are affected when steps (3) and (5) are performed.

25. A program storage device according to claim 22, comprising the step of:

identifying said substitute segments as segments that fail to be a part of said plurality of restoration pre-plans.

26. A program storage device according to claim 21, comprising the steps of:

providing notification of an inability to restore the failed route when said swappable segment is unavailable.

27. A program storage device according to claim 21, wherein step (2) comprises the steps of:

(a) querying said real-time topology database to identify another substitute segment for the failed segment;

(b) attempting to substitute said another substitute segment if said substitute segment is unavailable prior to performing steps (4) and (5); and (c) repeating steps (a) and (b) until all substitute segments for said failed segment have been exhausted.

28. A program storage device according to claim 21, wherein step (4) comprises the steps of:

(a) querying said real-time topology database to identify another swappable segment for the failed segment;

(b) attempting to swap said another swappable segment if said swappable segment is unavailable; and (c) repeating steps (a) and (b) until all swappable segments for said failed segment have been exhausted.

* * * * *